No. 834,847. PATENTED OCT. 30, 1906.
W. POLK.
MACHINE FOR FORMING HOLLOW BLOCKS.
APPLICATION FILED OCT. 14, 1905.

3 SHEETS—SHEET 1.

WITNESSES. INVENTOR.

No. 834,847. PATENTED OCT. 30, 1906.
W. POLK.
MACHINE FOR FORMING HOLLOW BLOCKS.
APPLICATION FILED OCT. 14, 1905.
3 SHEETS—SHEET 2.
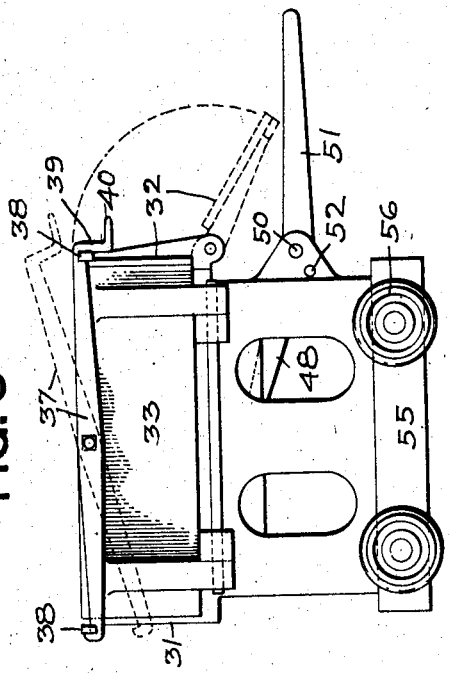
FIG. 3
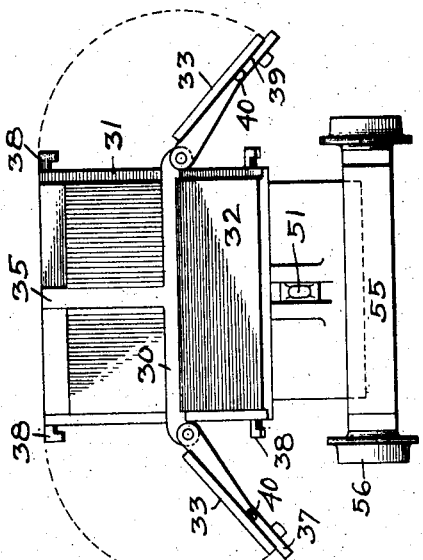
FIG. 4
FIG. 2
WITNESSES.
INVENTOR.

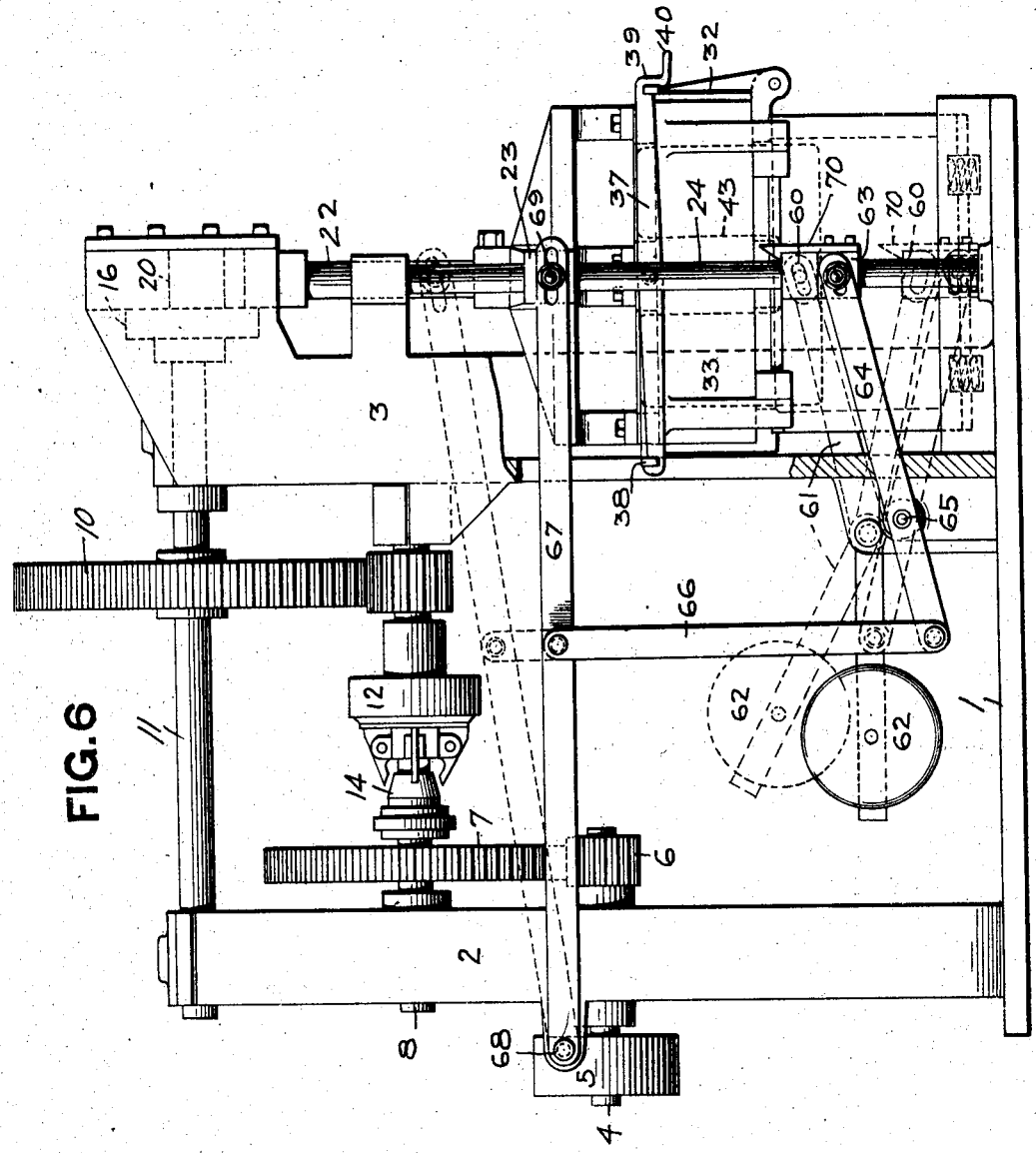

UNITED STATES PATENT OFFICE.

WILLIAM POLK, OF EAST LIVERPOOL, OHIO.

MACHINE FOR FORMING HOLLOW BLOCKS.

No. 834,847.

Specification of Letters Patent.

Patented Oct. 30, 1906.

Application filed October 14, 1905. Serial No. 282,784.

*To all whom it may concern:*

Be it known that I, WILLIAM POLK, a resident of East Liverpool, in the county of Columbiana and State of Ohio, have invented a new and useful Improvement in Machines for Forming Hollow Blocks; and I do hereby declare the following to be a full, clear, and exact description thereof.

This invention relates to a machine for making hollow bricks, blocks, and other plastic bodies.

The object of the invention is to provide a machine for this purpose which is simple of construction, efficient in operation, and which has a large capacity or output.

The invention consists in details of construction and arrangement which will be hereinafter described and claimed.

Figure 1:
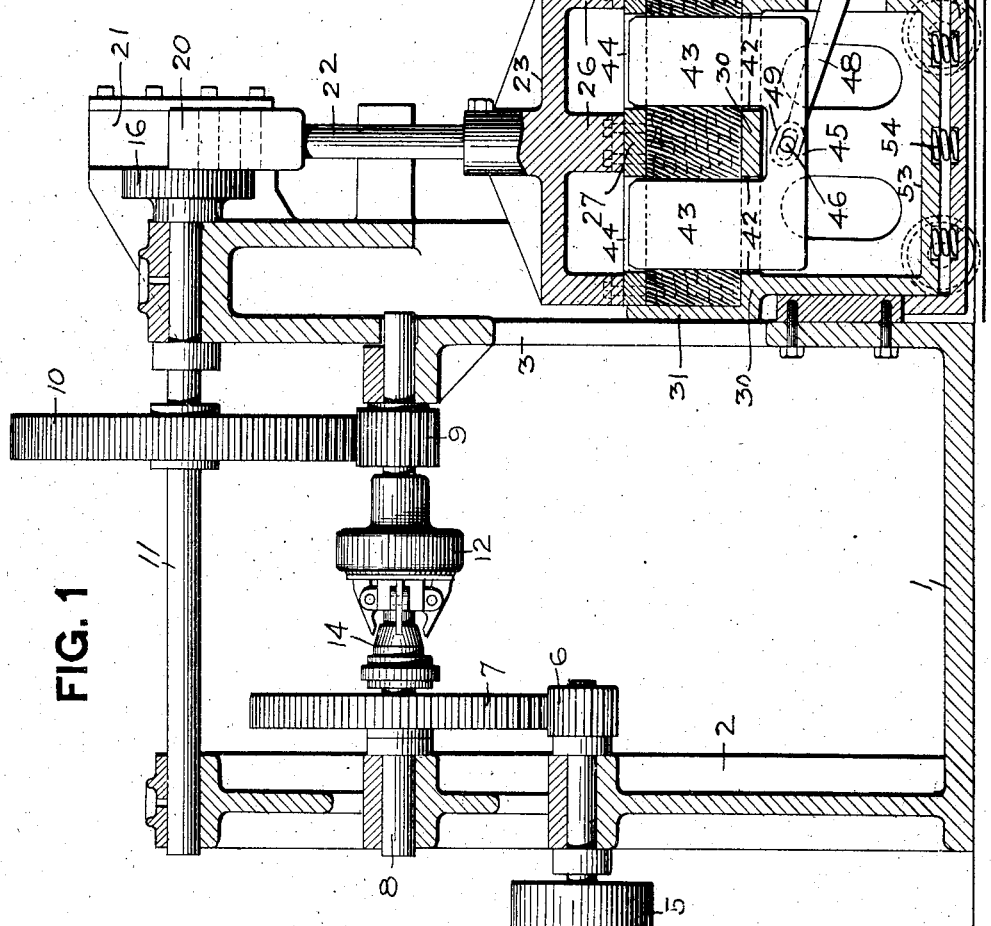
Figure 5:
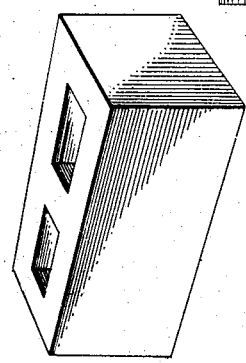

In the accompanying drawings, Figure 1 is a vertical longitudinal section of the machine. Fig. 2 is in part an end view and in part a transverse section of the same. Fig. 3 is a side view of a mold and its carriage. Fig. 4 is an end view of the same, showing the mold sides and ends displaced. Fig. 5 is a perspective view of a block or brick made by my machine, and Fig. 6 is a side view showing a modified form of the machine.

The machine comprises a suitable base 1, having rising therefrom standards or housings 2 and 3, which may be integral with the base or separate therefrom. Mounted in the standard 2 is the drive-shaft 4, which is provided with a pulley 5 or other suitable means for giving power to the machine. This shaft carries a pinion 6, meshing with the gear 7 on a shaft 8, mounted in the standards 2 and 3. This shaft carries a pinion 9, meshing with a gear 10 on a shaft 11, mounted in the upper ends of the standards 2 and 3. A suitable clutch 12 is on the shaft 8 between the gear 7 and pinion 9. One of the clutch members is loose on the shaft and the other keyed thereto, so that by means of the clutch the actuating mechanism of the machine may be stopped and started at pleasure. The clutch may be of any suitable type, that shown including a shiftable cone 14, which may be shifted by any suitable means. (Not shown.)

The shaft 11 at its outer end is provided with a wheel or disk 16, provided with a wrist-pin 17, which works in a block 18, slidably mounted in a transverse opening 19 in the cross-head 20. The latter is mounted to reciprocate vertically in ways 21 and has connected thereto the rod 22, which at its lower end is connected to a cross-head or plate 23. This cross-head at its ends embraces guide rods or posts 24, which are suitably secured to the frame of the machine and which serve to guide the cross-head 23 in a true vertical movement. To the lower face of the cross-head 23 are secured a series of blocks or posts 26, to the lower ends of which are bolted or otherwise secured the pressing dies or platen 27. The machine shown is a double machine—that is, for making two blocks at a time—and consequently employs two platens 27. One such platen or any number greater than two may, if desired, be employed.

The mold is of special construction, being composed of a bottom 30, having integral therewith or rigidly secured thereto one end portion 31, while the opposite end portion 32 and the two sides 33 are displaceable, preferably being hinged at their lower edges, as shown in Figs. 2, 3, and 4, so that they can swing out and down, as shown in Fig. 4, so as to permit the removal of the finished block. This mold is divided longitudinally by means of a partition 35, which is shown as integral with the bottom, although it may be suitably secured thereto. This partition divides the mold, so that, in effect, it is a double mold for making two blocks or bricks.

The displaceable sides and end of the mold will be provided with suitable means for locking the same in elevated or closed position. As shown in the drawings, each side piece has pivoted thereto a latch-bar 37, while both the stationary end piece 31 and the displaceable end piece 32 are provided with catches 38, having notches into which the ends of the latch-bars 37 may be swung, thus holding all sides of the mold in closed position. One end of the latch-bars 37 is bent downwardly, as at 39, so as to prevent the end 32 from being displaced, and the extreme ends of said bars are provided with handles 40 for moving the same. It is obvious, however, that various means may be adapted for locking the displaceable sides and ends of the mold.

The bottom 30 of the mold is provided with one or more openings 42, the mold shown having two such openings in each mold-section, or four openings in all. Through these openings project cores 43 of sufficient length so that when elevated their upper ends will project into openings 44 in the platens 27. These cores will be suitably connected so that they will move in unison. As shown in Fig. 1, the two cores are cast integral, having the bottom connecting portion 45, and these double cores are connected by a cross rod or member 46. (Shown in Fig. 2.) Suitably connected to the mold will be means for raising or lowering the same, the drawings showing for this purpose an arm 48, having a slotted end 49 for engaging the crossbar 46. This arm is one member of a lever pivoted at 50 and having the outwardly-projecting handle 51 for operating the cores. Suitable means will be provided for holding the molds in elevated position, such as a counterweight on the handle 51 or the like or a pin 52, adapted to be slipped underneath the arm 48.

In order to relieve the mold from the shock of the impact of the platens, said mold is provided with a suitable base 53, which is mounted on suitable cushions, such as the springs 54, interposed between the mold-base 53 and the plate 55. This plate 55 preferably will be a part of a carriage and to this end is provided with wheels 56, running on a track 57.

The operation of the machine is as follows: A number of molds will be provided for a single machine. These molds will be filled at any suitable place and by any suitable means and will then be run by means of the wheels shown along the track 57 underneath the plunger of the press. The cores 45 will be held elevated while the molds are being filled and the sides and ends of the molds will be locked in vertical position. When in proper position under the press, the latter will be operated, thus bringing the platen down into the molds and compressing the clay or other material firmly in the molds and around the cores. Figs. 1 and 2 show the press and molds in the position they will occupy during the compression of the clay in the molds. The springs 54 permit the entire mold to move downwardly slightly, thus cushioning the same and relieving the same from the shock of the impact of the press. As soon as the platens of the press are elevated the carriage, with the mold, will be run away on the track 57 and a new mold freshly filled with clay will be run in under the press in its place. As a consequence the press can be kept in practically continuous operation, a compressed mold being quickly superseded by a freshly-filled one. The result is that the output of the machine is very large. After the material is pressed in the molds the handle 51 will be raised, thus drawing the cores out of the mold and block. The sides and ends of the mold will then be released and permitted to fall outwardly and downwardly to the position shown in Fig. 4. The finished blocks can then be easily removed, after which the sides and end of the mold will again be raised and locked in vertical position and the cores elevated. The mold is then again ready for filling.

It is obvious that by means of my mold I can make hollow bodies of any character or description. The faces of the block or other body may be roughened or figured in any way, this being accomplished by merely giving the proper configuration to the inner surfaces of the mold sides and ends.

Inasmuch as the mold sides and ends are displaceable, an irregular-faced block or other body can be readily removed.

Fig. 6 shows a modification in which the mold is stationary instead of mounted on wheels. This modification shows automatic means for withdrawing the cores. The cores are connected to a cross-head 60, which is guided on the standards 24. Connected to this cross-head or to the cores themselves is a lever 61, carrying a counter-weight 62, which holds the cores normally elevated. Also guided on the standards 24 is a block or cross-head 63, which is connected to one end of a lever 64, fulcrumed at 65, and having its opposite end connected, by means of a link 66, to a lever 67. The latter is fulcrumed at 68 and has its free end connected by a pin or bolt 69 to the cross-head 23. The block or cross-head 63 is provided with a spring-latch 70 or other suitable means for engaging the cross-head 60.

When the platens are depressed, the cross-head 63 will be raised by the means described and the latch 70 will slip past and over the cross-head 60. Consequently when the platen is raised the cross-head 63 will be drawn downwardly by the lever and will draw with it the cross-head 60 and cores. This elevates the counterweight 62. When the block has been removed from the mold, the catch 63 will be released by hand, thus permitting the counterweight to elevate the cores.

What I claim is—

In a machine for making plastic bodies, the combination of a platen, actuating means therefor, a mold coöperating with said platen, a yielding support for said mold, a carriage on which said mold is carried, and tracks on which said carriage moves and leading underneath the platen.

In testimony whereof I, the said WILLIAM POLK, have hereunto set my hand.

WILLIAM POLK.

Witnesses:
  ROBT. D. TOTTEN,
  ROBERT C. TOTTEN.